United States Patent
Baptist et al.

(10) Patent No.: US 10,042,704 B2
(45) Date of Patent: Aug. 7, 2018

(54) VALIDATING STORED ENCODED DATA SLICE INTEGRITY IN A DISPERSED STORAGE NETWORK

(71) Applicant: International Business Machines Corporation, Armonk, NY (US)

(72) Inventors: Andrew D. Baptist, Mt. Pleasant, WI (US); Manish Motwani, Chicago, IL (US); Jason K. Resch, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 15/144,243

(22) Filed: May 2, 2016

(65) Prior Publication Data
US 2017/0031760 A1    Feb. 2, 2017

Related U.S. Application Data

(60) Provisional application No. 62/199,816, filed on Jul. 31, 2015.

(51) Int. Cl.
*G06F 11/10* (2006.01)
*H04L 29/08* (2006.01)
(Continued)

(52) U.S. Cl.
CPC ............ *G06F 11/108* (2013.01); *G06F 3/061* (2013.01); *G06F 3/0604* (2013.01); *G06F 3/065* (2013.01);
(Continued)

(58) Field of Classification Search
CPC .. G06F 11/108; G06F 3/0668; G06F 11/1076; H04L 67/1097
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Joseph D Torres
(74) *Attorney, Agent, or Firm* — Garlick & Markison; Timothy W. Markison; Bruce E. Stuckman

(57) ABSTRACT

An encoded data slice is received for storage by a dispersed storage and task (DST) execution unit. A plurality of initial integrity values are generated by executing a plurality of integrity check algorithms on the encoded data slice. The encoded data slice and the plurality of initial integrity values are stored in a memory of the DST execution unit. A subset of the plurality of integrity check algorithms are selected in response to a request to retrieve the encoded data slice. At least one final integrity value is generated by executing the subset of the plurality of integrity check algorithms on the encoded data slice stored in memory. An integrity status is generated by comparing the at least one final integrity value to the corresponding subset of the plurality of initial integrity values.

20 Claims, 4 Drawing Sheets

(51) Int. Cl.
  *G06F 3/06* (2006.01)
  *H04L 29/06* (2006.01)
  *G06F 17/30* (2006.01)
  *G06F 11/16* (2006.01)
  *G06F 13/42* (2006.01)
  *G06F 21/62* (2013.01)
  *H04L 9/08* (2006.01)
  *H03M 13/29* (2006.01)
  *H03M 13/37* (2006.01)
  *G06F 21/64* (2013.01)
  *H03M 13/15* (2006.01)

(52) U.S. Cl.
  CPC ........... *G06F 3/0605* (2013.01); *G06F 3/067* (2013.01); *G06F 3/0619* (2013.01); *G06F 3/0622* (2013.01); *G06F 3/0643* (2013.01); *G06F 3/0644* (2013.01); *G06F 3/0647* (2013.01); *G06F 3/0653* (2013.01); *G06F 3/0668* (2013.01); *G06F 3/0689* (2013.01); *G06F 11/1076* (2013.01); *G06F 11/1662* (2013.01); *G06F 13/4282* (2013.01); *G06F 17/3053* (2013.01); *G06F 17/30082* (2013.01); *G06F 17/30197* (2013.01); *G06F 21/6218* (2013.01); *G06F 21/645* (2013.01); *H03M 13/2906* (2013.01); *H03M 13/3761* (2013.01); *H04L 9/0861* (2013.01); *H04L 63/061* (2013.01); *H04L 63/0853* (2013.01); *H04L 63/108* (2013.01); *H04L 67/1097* (2013.01); *H04L 67/327* (2013.01); *G06F 3/064* (2013.01); *G06F 2201/805* (2013.01); *H03M 13/1515* (2013.01); *H04L 63/0428* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,312,356 B1* | 11/2012 | Cousins | H03M 13/15 708/316 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0064934 A1* | 3/2007 | Batcher | H04L 9/0637 380/44 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2007/0300121 A1* | 12/2007 | Cooper | G06F 11/1008 714/755 |
| 2008/0320375 A1* | 12/2008 | Hori | H04L 1/0061 714/807 |
| 2009/0094251 A1 | 4/2009 | Gladwin et al. | |
| 2009/0094318 A1 | 4/2009 | Gladwin et al. | |
| 2009/0307766 A1* | 12/2009 | Rose | H04L 1/02 726/13 |
| 2010/0023524 A1 | 1/2010 | Gladwin et al. | |
| 2010/0085964 A1* | 4/2010 | Weir | H04L 1/0084 370/389 |
| 2010/0332751 A1* | 12/2010 | Quigley | H04L 69/08 711/114 |
| 2012/0063535 A1* | 3/2012 | Sakata | H04W 28/065 375/295 |
| 2013/0054850 A1* | 2/2013 | Co | H04L 12/4633 710/105 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner distributed computing system 10

VALIDATING STORED ENCODED DATA SLICE INTEGRITY IN A DISPERSED STORAGE NETWORK

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
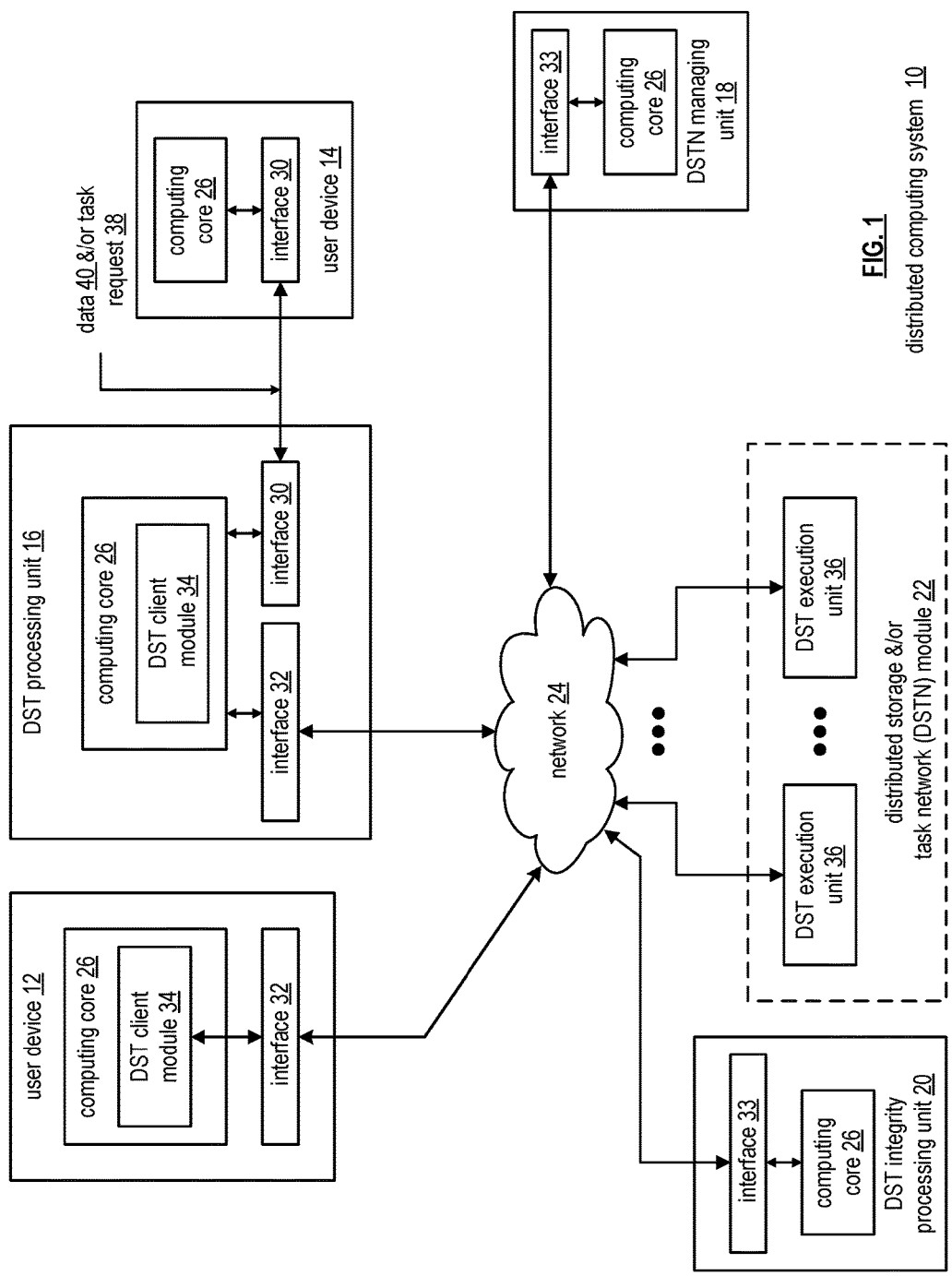
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts at accessing the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
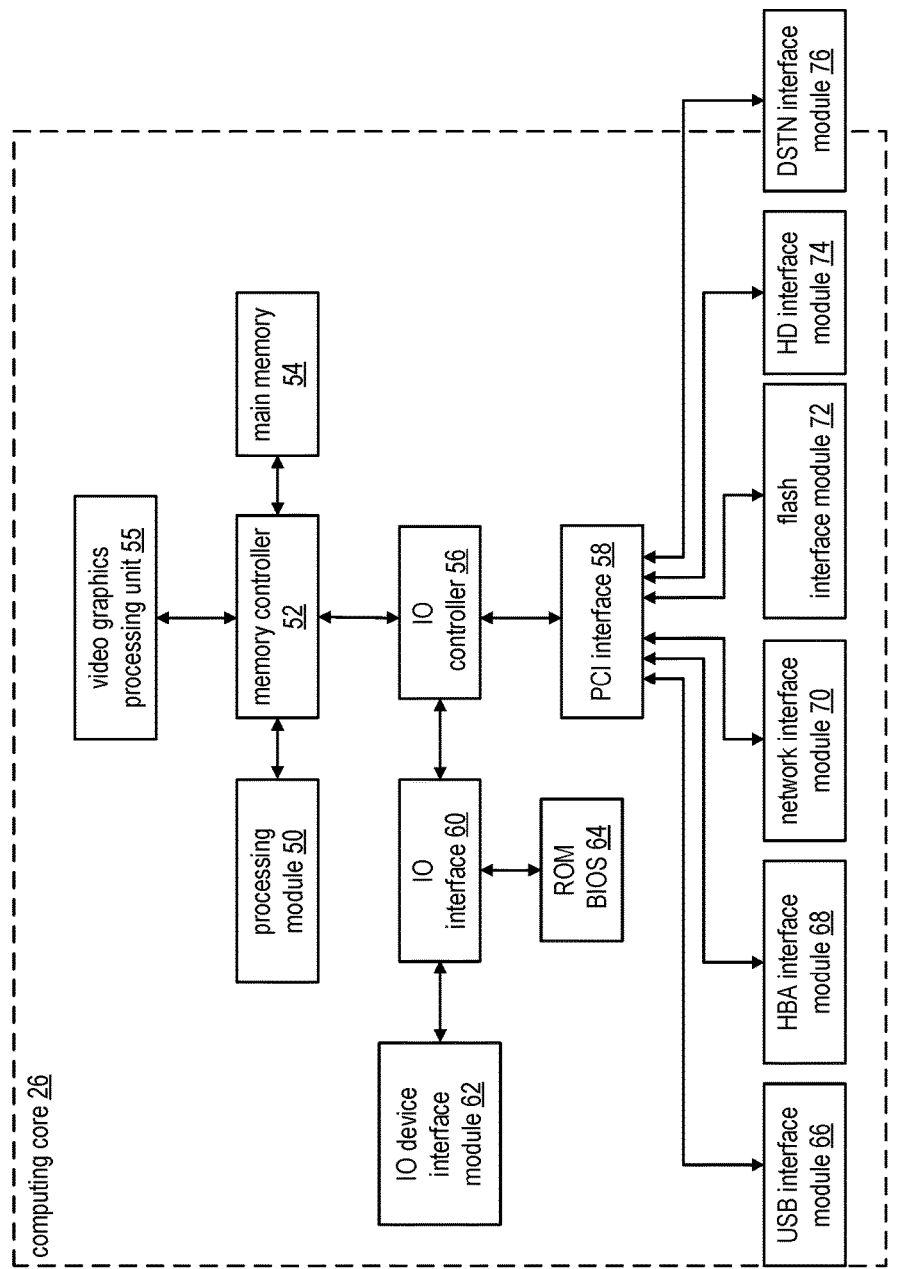
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
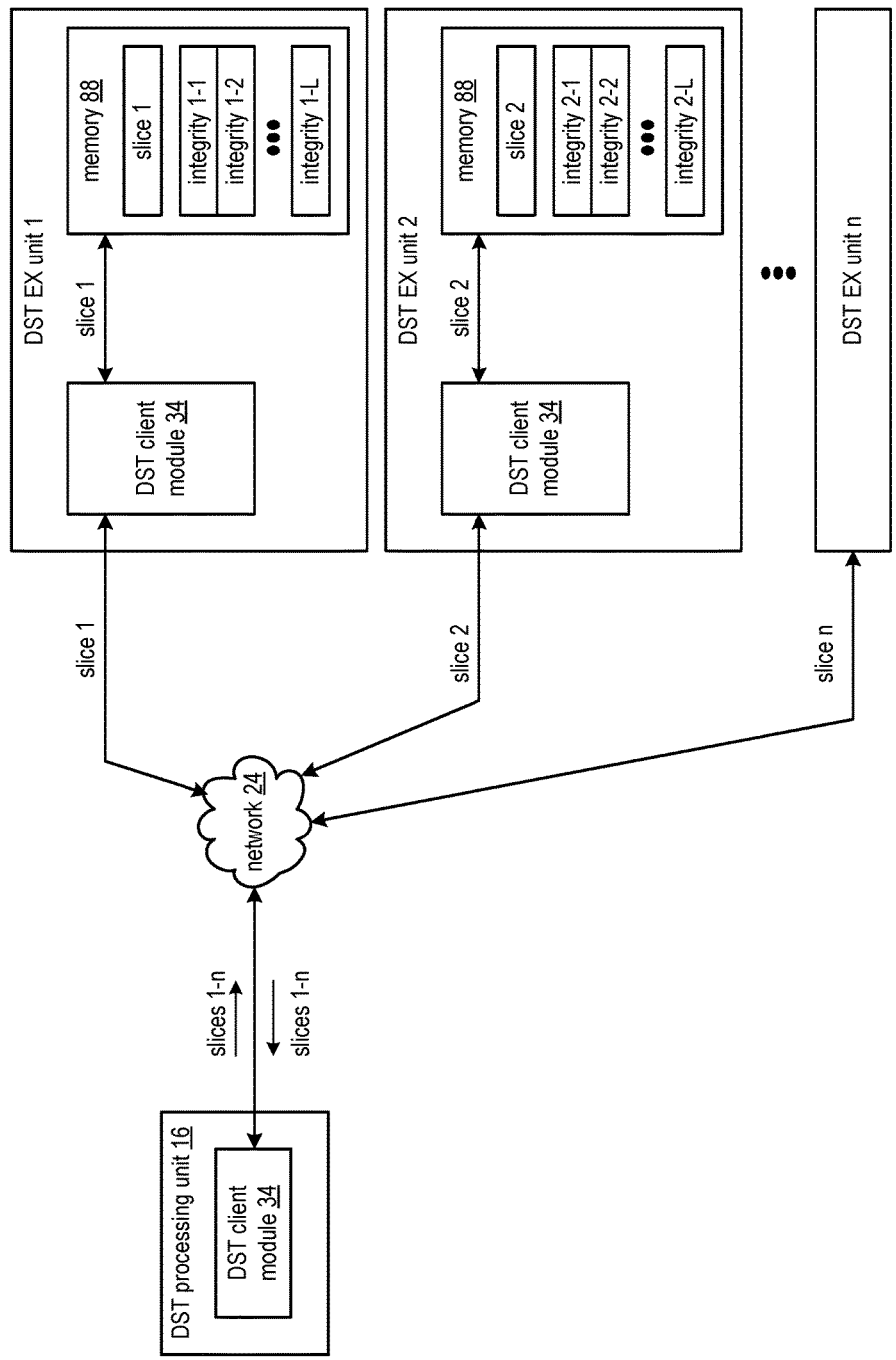
FIG. 3 is a schematic block diagrams of an embodiment of a dispersed storage network (DSN) in accordance with the present invention.

FIG. 3 is a schematic block diagram of another embodiment of a dispersed storage network (DSN) that includes the distributed storage and task (DST) processing unit 16 of FIG. 1, the network 24 of FIG. 1, and a set of DST execution (EX) units 1-n. Each DST execution unit includes the DST client module 34 of FIG. 1 and a memory 88. Hereafter, the set of DST execution units may be interchangeably referred to as a set of storage units and the DST execution unit may be interchangeably referred to as a storage unit. Each DST execution unit may be implemented utilizing the DST execution unit 36 of FIG. 1. The DSN functions to validate stored encoded data slice integrity.

In various embodiments, a DST execution unit, upon storing a slice, can elect to compute any from among a set of possible integrity check algorithms, possibly computing multiple integrity check values for the same slice. The DST execution unit may not compute all of them at the time the slice is received, but instead may compute the others in the background, as spare computing cycles become available. Each integrity check algorithm can indicate a number of bits of protection (or a probability of a false negative—not detecting an integrity error). Different integrity check algorithms may have different trade-offs in terms of computational efficiency vs. probability of false negatives.

Therefore, at time of read, a DST execution unit can select which integrity check algorithm (from among those that had been pre-computed) to use to verify the slice before returning it. For example, when low on spare computing cycles, the DST execution unit can use a computationally efficient, but more error prone integrity check function, while when there are ample cycles, the DST execution unit can choose to use a more expensive algorithm that is less likely to have a false negative. The integrity check algorithm selection can also be determined by a field in the requesters read request. For example, if response time and latency are the primary concern for the requester, it can indicate to the DST execution unit to bypass the integrity check or to use only the fastest ones, while a requester more concerned with correctness of the data may be willing to wait for a more thorough integrity check function. For further proof against false-negatives, the DST execution unit can randomly/round-robin test different integrity check algorithms, such that a false-positive by one function might be detected by a different algorithm.

In an embodiment, a processing system of a dispersed storage and task (DST) execution unit comprises at least one processor and a memory that stores operational instructions, that when executed by the at least one processor causes the processing system to receive an encoded data slice for storage by the DST execution unit. A plurality of initial integrity values are generated by executing a plurality of integrity check algorithms on the encoded data slice. The encoded data slice and the plurality of initial integrity values are stored in a memory of the DST execution unit. A subset of the plurality of integrity check algorithms are selected in response to a request to retrieve the encoded data slice. At least one final integrity value is generated by executing the subset of the plurality of integrity check algorithms on the encoded data slice stored in memory. An integrity status is generated by comparing the at least one final integrity value to the corresponding subset of the plurality of initial integrity values.

In various embodiments of the processing system, the plurality of integrity check algorithms to be executed on the encoded data slice are selected by the processing system. In some embodiments, the plurality of integrity check algorithms are selected based on at least one of: a processing resource availability level, a desired false-negative probability level, or an algorithm computational efficiency level. In some embodiments, a first integrity check algorithm is more error-prone than a second integrity check algorithm, wherein the plurality of integrity check algorithms selected includes the first integrity check algorithm in response to determining that processing resource availability is low, and where the plurality of integrity check algorithms selected includes the second integrity check algorithm in response to determining that sufficient processing resources are available. In some embodiments, a first integrity check algorithm is faster than a second integrity check algorithm, and the plurality of integrity check algorithms selected includes the first integrity check algorithm in response to determining that a low desired latency level is required.

In various embodiments of the processing system, the operational instructions, when executed by the at least one processor, further cause the processing system to generate a plurality of priority levels corresponding to each of the plurality of integrity check algorithms, where the plurality of integrity check algorithms are executed in an order based on the plurality of priority levels. In some embodiments, the plurality of identifiers corresponding to the plurality of integrity check algorithms are stored in the memory.

In various embodiments of the processing system, the subset of the plurality of integrity check algorithms is a non-null proper subset that is selected based on at least one of: an available resource level, a required retrieval performance level, and a recovery desired maximum false-negative probability level. In some embodiments, the integrity status indicates a favorable comparison when a result of the comparison indicates that the plurality of initial integrity values and the at least one final integrity value are substantially identical, and the integrity status indicates an unfavorable comparison when a result of the comparison indicates that the at least one initial integrity value and the at least one final integrity value are not substantially identical. In some embodiments, the encoded data slice and the integrity status are transmitted to an entity that generated the request to retrieve the encoded data slice.

In an example of operation of the validating of the stored encoded data slice integrity, a storage unit can receive an encoded data slice for storage. For example, the DST execution unit 1 receives, via the network 24, slice 1 of a set of slices 1-n from the DST client module 34 of the DST processing unit 16. Having received the encoded data slice for storage, the storage unit can select one or more integrity check algorithms from a plurality of integrity check algorithms based on one or more of a processing resource availability level, a desired false-negative probability level, an algorithm computational efficiency level, a predetermination, a requested list of algorithms, a desired latency level, system registry information, and/or an integrity approach. For example, the DST client module 34 of the DST execution unit 1 can select a more computationally efficient algorithm that is more error-prone when low on processing resource availability. As another example, the DST client module 34 utilizes a less error-prone algorithm that requires more processing resources when sufficient processing resources are available. As yet another example, the DST client module 34 utilizes a faster computational algorithm when a low desired latency level is required.

Having selected the integrity check algorithms, the storage unit can perform the selected one or more integrity check algorithms on the received encoded data slice to produce one or more integrity values 1-L. For example, the DST client module 34 of the DST execution unit 1 performs a first integrity check algorithm on the received encoded data slice to produce an integrity value 1-1, performs a second integrity check algorithm on the received encoded data slice to produce an integrity value 1-2, through performing an Lth integrity check algorithm on a received encoded data slice to produce an integrity value 1-L. The performing of the selected one or more integrity check algorithms can further include executing a highest priority integrity check algorithm first followed by a next highest priority integrity check algorithm etc.

Having produced the integrity values, the storage unit can facilitate storage of the received encoded data slice and the one or more integrity values in a local memory. For example, the DST client module 34 of the DST execution unit 1 stores the encoded data slice in the memory 88 of the DST execution unit 1 and stores the integrity values 1-1 through 1-L in the memory 88. Facilitating the storage can further include the DST processing unit 34 storing the identifiers of the integrity check algorithms in the memory 88.

When recovering the encoded data slice, the storage unit can retrieve the encoded data slice and at least one integrity value from the local memory. Retrieving the encoded data slice can further include retrieving the identifiers of the integrity check algorithms from the memory 88. Having retrieved the encoded data slice, the storage unit can select one or more recovery integrity check algorithms (e.g., a subset of the selected one or more integrity check algorithms) based on the identifiers of the integrity check algorithms corresponding to the one or more integrity values. The selection can be based on one or more of an available resource level, a required retrieval performance level, a recovery desired maximum false-negative probability level, and/or a prioritization of the recovery integrity check algorithms.

Having selected the recovery integrity check algorithms, the storage unit can perform the selected one or more recovery integrity check algorithms on the retrieved encoded data slice to produce one or more calculated integrity values. Having produced the calculated integrity values, the storage unit can indicate the integrity status of the retrieved encoded data slice based on a comparison of the retrieved at least one integrity value and corresponding one or more calculated integrity values. For example, the DST client module 34 of the DST execution unit 1 can indicate a favorable comparison when the comparison is substantially the same. As another example, the DST client module 34 of the DST execution unit 1 can indicate an unfavorable comparison when the comparison is not substantially the same.

Having indicated the integrity status, the storage unit can send the retrieved encoded data slice and the integrity status to a requesting entity. For example, the DST client module 34 of the DST execution unit 1 and sends, via the network 24, the retrieved encoded data slice and the integrity status to the DST processing unit 16.

Figure 4:
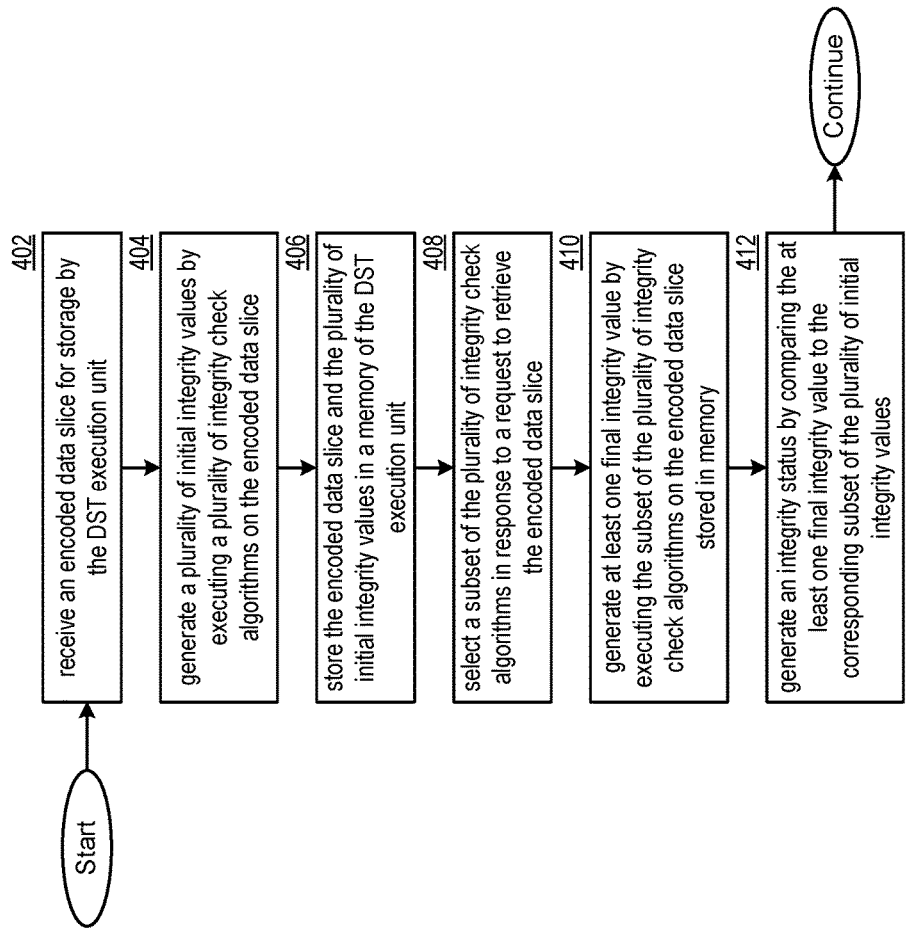
FIG. 4 is a flowchart illustrating an example of validating stored encoded data slice integrity in accordance with the present invention.

FIG. 4 is a flowchart illustrating an example of validate stored encoded data slice integrity. In particular, a method is presented for use in conjunction with one or more functions and features described in conjunction with FIGS. 1-4 is presented for execution by a dispersed storage and task (DST) execution unit that includes a processor or via another processing system of a dispersed storage network that includes at least one processor and memory that stores instruction that configure the processor or processors to perform the steps described below. Step 402 includes receiving an encoded data slice for storage by the DST execution unit. Step 404 includes generating a plurality of initial integrity values by executing a plurality of integrity check algorithms on the encoded data slice. Step 406 includes storing the encoded data slice and the plurality of initial integrity values in a memory of the DST execution unit. Step 408 includes selecting a subset of the plurality of integrity check algorithms in response to a request to retrieve the encoded data slice. Step 410 includes generating at least one final integrity value by executing the subset of the plurality of integrity check algorithms on the encoded data slice stored in memory. Step 412 includes generating an integrity status by comparing the at least one final integrity value to the corresponding subset of the plurality of initial integrity values.

In various embodiments, the plurality of integrity check algorithms to be executed on the encoded data slice are selected by the processing system. In some embodiments, the plurality of integrity check algorithms are selected based on at least one of: a processing resource availability level, a desired false-negative probability level, or an algorithm computational efficiency level. In some embodiments, a first integrity check algorithm is more error-prone than a second integrity check algorithm, wherein the plurality of integrity check algorithms selected includes the first integrity check algorithm in response to determining that processing resource availability is low, and where the plurality of integrity check algorithms selected includes the second integrity check algorithm in response to determining that sufficient processing resources are available. In some embodiments, a first integrity check algorithm is faster than a second integrity check algorithm, and where the plurality of integrity check algorithms selected includes the first integrity check algorithm in response to determining that a low desired latency level is required.

In various embodiments, the operational instructions, when executed by the at least one processor, further causes the processing system to generate a plurality of priority levels corresponding to each of the plurality of integrity check algorithms, where the plurality of integrity check algorithms are executed in an order based on the plurality of priority levels. In some embodiments, the plurality of identifiers corresponding to the plurality of integrity check algorithms are stored in the memory.

In various embodiments, the subset of the plurality of integrity check algorithms is a non-null proper subset that is selected based on at least one of: an available resource level, a required retrieval performance level, and a recovery desired maximum false-negative probability level. In some embodiments, the integrity status indicates a favorable comparison when a result of the comparison indicates that the plurality of initial integrity values and the at least one final integrity value are substantially identical, and the integrity status indicates an unfavorable comparison when a result of the comparison indicates that the at least one initial integrity value and the at least one final integrity value are not substantially identical. In some embodiments, the encoded data slice and the integrity status are transmitted to an entity that generated the request to retrieve the encoded data slice.

The method described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a dispersed storage and task (DST) execution unit that includes a processor, the method comprises:
    for a write request regarding an encoded data slice:
        receiving the encoded data slice for storage by the DST execution unit;
        generating a plurality of initial integrity values for the encoded data slice by executing a plurality of integrity check algorithms on the encoded data slice;
        storing the encoded data slice and the plurality of initial integrity values in a memory of the DST execution unit; and
    for a read request regarding the encoded data slice:
        selecting a subset of the plurality of integrity check algorithms in response to the read request;
        generating at least one final integrity value by executing the subset of the plurality of integrity check algorithms on the encoded data slice stored in the memory;
        generating an integrity status by comparing the at least one final integrity value to the corresponding subset of the plurality of initial integrity values; and
        when the integrity status is favorable, sending the encoded data slice to a requesting computing device in response to the read request.

2. The method of claim 1, further comprising selecting the plurality of integrity check algorithms to be executed on the encoded data slice.

3. The method of claim 2, wherein the plurality of integrity check algorithms are selected based on at least one of: a processing resource availability level, a desired false-negative probability level, or an algorithm computational efficiency level.

4. The method of claim 2, wherein a first integrity check algorithm is more error-prone than a second integrity check algorithm, wherein the plurality of integrity check algorithms selected includes the first integrity check algorithm in response to determining that processing resource availability is low, and wherein the plurality of integrity check algorithms selected includes the second integrity check algorithm in response to determining that sufficient processing resources are available.

5. The method of claim 2, wherein a first integrity check algorithm is faster than a second integrity check algorithm, and wherein the plurality of integrity check algorithms selected includes the first integrity check algorithm in response to determining that a low desired latency level is required.

6. The method of claim 1 further comprising:
generating a plurality of priority levels corresponding to each of the plurality of integrity check algorithms;
wherein the plurality of integrity check algorithms are executed in an order based on the plurality of priority levels.

7. The method of claim 1 further comprising storing a plurality of identifiers corresponding to the plurality of integrity check algorithms in the memory.

8. The method of claim 1 wherein the subset of the plurality of integrity check algorithms is a non-null proper subset that is selected based on at least one of: an available resource level, a required retrieval performance level, and a recovery desired maximum false-negative probability level.

9. The method of claim 1 wherein the integrity status indicates a favorable comparison when a result of the comparison indicates that the plurality of initial integrity values and the at least one final integrity value are substantially identical, and wherein the integrity status indicates an unfavorable comparison when a result of the comparison indicates that the corresponding subset of the plurality of initial integrity values and the at least one final integrity value are not substantially identical.

10. The method of claim 1, wherein the sending further comprises sending the integrity status.

11. A processing system of a dispersed storage and task (DST) execution unit comprises:
at least one processor;
a memory that stores operational instructions, that when executed by the at least one processor cause the processing system to:
for a write request regarding an encoded data slice:
receive the encoded data slice for storage by the DST execution unit;
generate a plurality of initial integrity values for the encoded data slice by executing a plurality of integrity check algorithms on the encoded data slice;
store the encoded data slice and the plurality of initial integrity values in a memory of the DST execution unit; and
for a read request regarding the encoded data slice:
select a subset of the plurality of integrity check algorithms in response to the read request;
generate at least one final integrity value by executing the subset of the plurality of integrity check algorithms on the encoded data slice stored in the memory;
generate an integrity status by comparing the at least one final integrity value to the corresponding subset of the plurality of initial integrity values; and
when the integrity status is favorable, sending the encoded data slice to a requesting computing device in response to the read request.

12. The processing system of claim 11, further comprising selecting the plurality of integrity check algorithms to be executed on the encoded data slice.

13. The processing system of claim 12, wherein the plurality of integrity check algorithms are selected based on at least one of: a processing resource availability level, a desired false-negative probability level, or an algorithm computational efficiency level.

14. The processing system of claim 12, wherein a first integrity check algorithm is more error-prone than a second integrity check algorithm, wherein the plurality of integrity check algorithms selected includes the first integrity check algorithm in response to determining that processing resource availability is low, and wherein the plurality of integrity check algorithms selected includes the second integrity check algorithm in response to determining that sufficient processing resources are available.

15. The processing system of claim 12, wherein a first integrity check algorithm is faster than a second integrity check algorithm, and wherein the plurality of integrity check algorithms selected includes the first integrity check algorithm in response to determining that a low desired latency level is required.

16. The processing system of claim 11 further comprising:
generating a plurality of priority levels corresponding to each of the plurality of integrity check algorithms;
wherein the plurality of integrity check algorithms are executed in an order based on the plurality of priority levels.

17. The processing system of claim 11 further comprising storing a plurality of identifiers corresponding to the plurality of integrity check algorithms in the memory.

18. The processing system of claim 11 wherein the subset of the plurality of integrity check algorithms is a non-null proper subset that is selected based on at least one of: an available resource level, a required retrieval performance level, and a recovery desired maximum false-negative probability level.

19. The processing system of claim 11 wherein the integrity status indicates a favorable comparison when a result of the comparison indicates that the plurality of initial integrity values and the at least one final integrity value are substantially identical, and wherein the integrity status indicates an unfavorable comparison when a result of the comparison indicates that the at least one initial integrity value and the at least one final integrity value are not substantially identical.

20. A non-transitory computer readable storage medium comprises:
at least one memory section that stores operational instructions that, when executed by a processing system of a dispersed storage network (DSN) that includes a processor and a memory, causes the processing system to:
for a write request regarding an encoded data slice:
receive the encoded data slice for storage;
generate a plurality of initial integrity values for the encoded data slice by executing a plurality of integrity check algorithms on the encoded data slice;
store the encoded data slice and the plurality of initial integrity values in a memory of a dispersed storage and task (DST) execution unit; and
for a read request regarding the encoded data slice:
select a subset of the plurality of integrity check algorithms in response to the read request;
generate at least one final integrity value by executing the subset of the plurality of integrity check algorithms on the encoded data slice stored in the memory;
generate an integrity status by comparing the at least one final integrity value to the corresponding subset of the plurality of initial integrity values; and when the integrity status is favorable, sending the encoded data slice to a requesting computing device in response to the read request.

\* \* \* \* \*